Sept. 13, 1927.

V. G. APPLE 1,642,057

ARMATURE

Filed Aug. 14, 1925

Inventor:
Vincent G. Apple
By Foree Bain Hinkle
Attys.

Sept. 13, 1927.    V. G. APPLE    1,642,057
ARMATURE
Filed Aug. 14, 1925    2 Sheets-Sheet 2
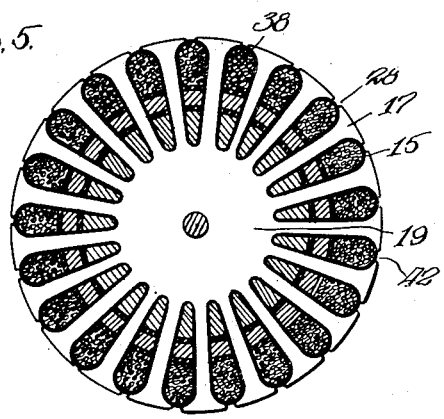
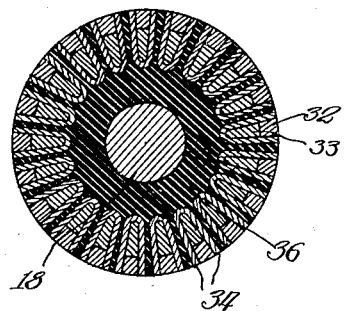
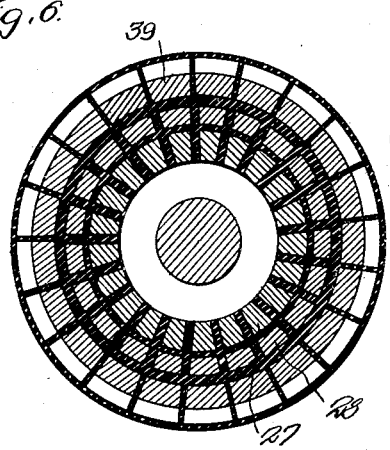
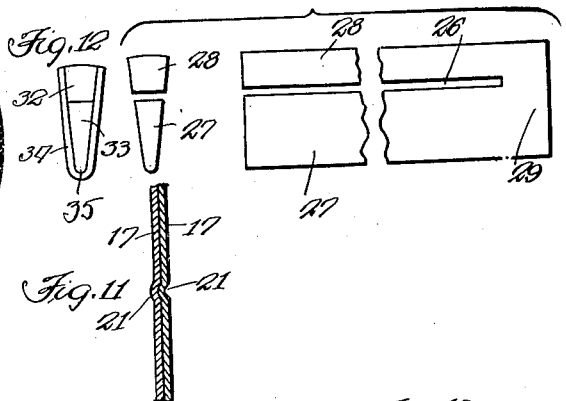
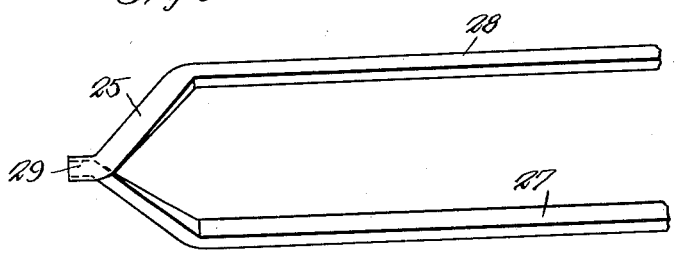
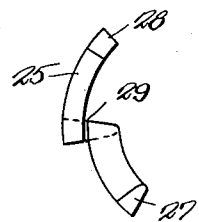
Inventor:
Vincent G. Apple
By Foree Bain Hinkle
Attys.

Patented Sept. 13, 1927.

1,642,057

UNITED STATES PATENT OFFICE.

VINCENT G. APPLE, OF DAYTON, OHIO.

ARMATURE.

Application filed August 14, 1925. Serial No. 50,308.

This application is partially based upon the subject matter of an application filed by me on May 27, 1920, under Serial No. 384,575, which application became abandoned by operation of law and of which this application is a substantial copy.

The invention relates to improvements in armatures for dynamo electric machines and has especial reference to armatures having a double winding, either of which may produce or receive current independently of the other.

One of the objects of the invention is to increase the cubic, dynamic and operative efficiency of dynamos, whereby to produce the greatest output for a given weight, or maximum torque-speed when used as a motor.

Another object is to wind the armature with conductor bars in which the cross-section of the bars, in a given slot, are wedge-shape, corresponding as a whole in general outline, to the shape of a portion of the slot within which they are contained.

Another object is to construct a commutator of the terminal ends of the wedge-shape conducting bars, without joints therebetween and in which the thinner bars are near the axis of the armature and the thicker bars are superimposed thereon in the same relation they occupy in the armature slot and a novel manner of joining the wedge-shaped members of the commutator together to produce a commutator of substantially the same diameter as the winding.

Another object is to utilize the entire cubic contents of the laminated core, by securing terminal ends of shaft sections to the ends of the core without passing it thru the core.

Another object is the provision of a novel manner of holding the ends of the conducting bars together to form commutator sections.

Another object is to provide an armature in which the commutator, for the outer windings, overlies the cross-connections of the inner windings.

Another object is to provide a new form of slot in the armature core.

Another object is to cement the two windings of the double wound armature together and to the core at the same time and by use of the same adhesive.

Other, further and more specific objects of the invention will become readily apparent, to persons skilled in the art, from a consideration of the following description, when taken in conjunction with the drawings, wherein:—

Figure 5 is a transverse section taken on line V—V of Figure 3.

Figure 6 is a section taken on line VI—VI of Figure 4.

Figure 7 is a section of the smaller commutator taken on line VII—VII of Figure 2.

Figure 8 shows the shape of the conductors forming a wish-bone loop, as more clearly shown in Figure 9.

Figure 10 is an end view of Figure 9.

Figure 11 is a section of two of the laminations showing one means of holding them in register instead of the use of the small rod passing thru the laminations, as shown in Figure 1.

Figure 12 shows the end of the smaller and larger conductors as they are joined together to form a commutator section.

In all the views the same reference characters are employed to indicate similar parts.

Figure 1:
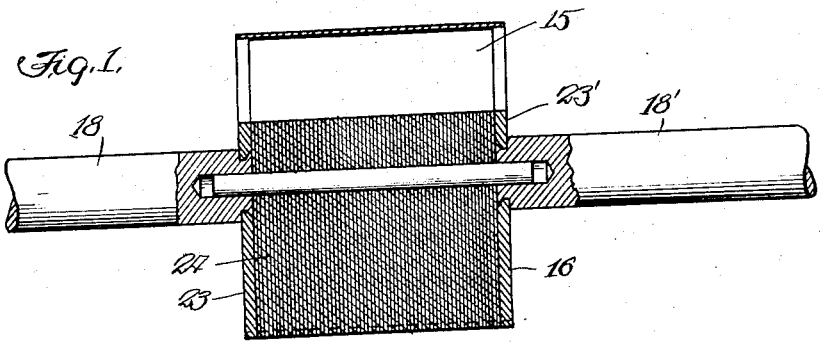
Figure 1 shows an elevation, partly in section, of the core of the armature and shaft sections connected thereto.

In the new structure the slots 15 are made much deeper in the core 16 than usual. The disks 17 are also not perforated axially with sufficient openings to admit the shaft sections 18—18'. Therefore a larger mass of the highly permeable, laminated core structure 19, is utilized, and, furthermore, the portions of the disks 17 that separate the slots 15 are substantially uniform in circumferential direction to include a substantially equal mass of metal between adjacent coils where they radially confront each other. In order that the disks 17 may be packed in uniform stacks, I may perforate them either with a small opening and use the rod 20, as shown in Figure 1, or I may centrally indent each of the disks, as at 21, as shown in Figure 11. The latter I consider to be the preferable mode. I then coat the laminæ, of which the core 16 is composed, with a phenolic condensation product and, after having secured the shaft sections 18—18' to the end disks 23—23', which are laterally somewhat thicker than the intermediate disks of the laminæ, I apply pressure and heat to the core in order to unite the laminæ, to thoroughly cement the parts together. For relatively small machines, this means for holding the disks of laminæ structure together is sufficient. A full explanation of the means of joining the disks, for the purpose described, is disclosed in my Patent No. 1,315,936, of September 16, 1919. Any means for holding the laminæ composing the core of the armature without the necessity of passing the shaft therethru will come within the contemplation of my invention. The shaft sections 18—18' may be secured to the end disks 23—23', as at 24, by riveting, welding, or the like.

The conductor loop 25 may be made in wishbone shape, as shown in Figures 9 and 10. In making the wish-bone, a conductor of uniform wedge-shape and substantially uniform area, in cross section, as shown in Figure 8, is split near the thicker edge, as at 26, to provide a wide thin member 27, and a thicker narrower member 28, the part 29 being the yoke to which the two members 27 and 28 are left attached. Or, if desired, the wish-bone loop may be made up of two separate inductor bars, one to provide the wide, thin member 27 and the other to provide the thicker, narrower member 28, the bars being bent as at 25 and joined by welding or otherwise to provide the yoke 29. Instead of using the wish bone, as shown in Figure 9, two straight bar conductors, of cross section, substantially as shown herein, may be placed within the slots 15, and the ends of the conductors may be rotatively displaced, paired and connected together, as more clearly shown and described in my Patent No. 1,264,749, granted April 30, 1918. The rotary displacement of the conductor members 27 and 28 near the ends of the armature, in any event, is indicated, as at 30 and 31.

Figure 2:
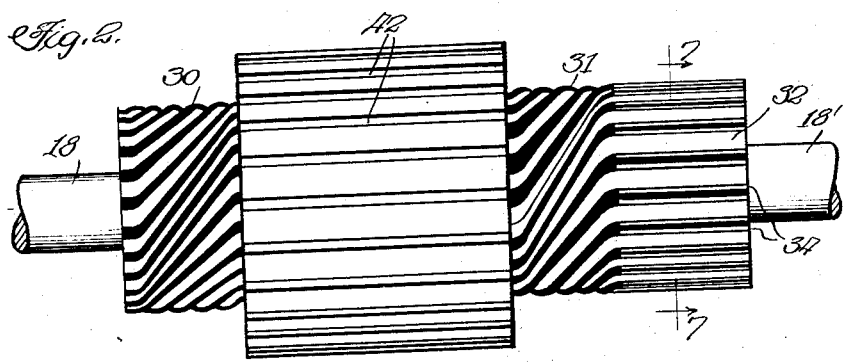
Figure 2 is an elevation of the inner bar winding as it appears upon the core.

In the instant case the ends 31 are prolonged, as at 32, into commutator sections. The part section 32 is made of the upper narrower and thicker member, while the part section 33, of the commutator, is made of the inner and thinner member 27, of the conductor bar, the two part sections forming a composite commutator section. After the conducting bars have been placed upon the core 16, and the ends have been rotatively displaced, as shown in Figure 2, then each pair of commutator segments is separated by a U-shaped metal structure 34. This may consist of a piece of relatively thin copper bent in the shape shown in Figures 7 and 12, partly surrounding the two paired conductors 32 and 33, on their respective sides, to hold them temporarily together. After these pieces have been placed, as shown in Figure 7, they are welded to the under section 33, as at 35. After this has been accomplished, the commutator 32 is placed in a mold and insulating phenolic compound 36 is forced by pressure into the spaces between adjacent commutator sections and the body portion between the commutator and the shaft 18. This material is forced under considerable pressure and therefore the sides of the U-shape part 34 will be held intimately in contact with the confronting sides of the members 32 and 33, of each commutator bar, and the insulation between the members 34 will sufficiently separate them and hold all of the parts of the commutator structure firmly together.

The insulation of the commutator 32 may be accomplished immediately upon placing the first winding on the core, as shown in Figure 2, or it may be accomplished at the time just before the armature is entirely finished and after the second winding has been placed in position and the commutator thereof located upon the shaft and insulated in a similar manner.

Overlying the armature conductors 27—28, in each slot, is a coil 38, of relatively fine wire, comprising a number of turns which is subsequently placed in the larger portion of the slots 15 and over the top of the conducting bars formerly placed within the slots. After the second winding has been placed upon the armature, a commutator 39 may be placed on the opposite end of the armature structure and connected to the fine wire winding 38, or it may be placed as at 39', on the modified form shown in Figure 4. In Figure 4 the commutator 39' is placed above the end terminals 31 of the conducting bars 27 and 28, and, it will be observed that this arrangement economizes linear dimensions of the armature, to some extent. The terminal ends Fig. 3 of the coils 38 are embedded in insulating material 40—40' and while the drawings show the coils to be of relatively fine wire, they may also be composed of fewer turns of coarser wire, or of several turns of insulated strip or ribbon stock. In any event they are subsequently enclosed in a coating of phenolic condensation product.

After the armature has been completed, in the manner described, the entire structure may be placed in a mold, or hollow die, and phenolic condensation product injected into the mold or die under pressure and subsequently heated so that the phenolic condensation product will, when cold, firmly hold the parts in their proper relation and produce the highest character of insulation, and thereby strengthen the structure without requiring screws, clamps or clasps for that purpose, as disclosed in my Patent 1,440,951, January 2nd, 1923.

Figure 3:
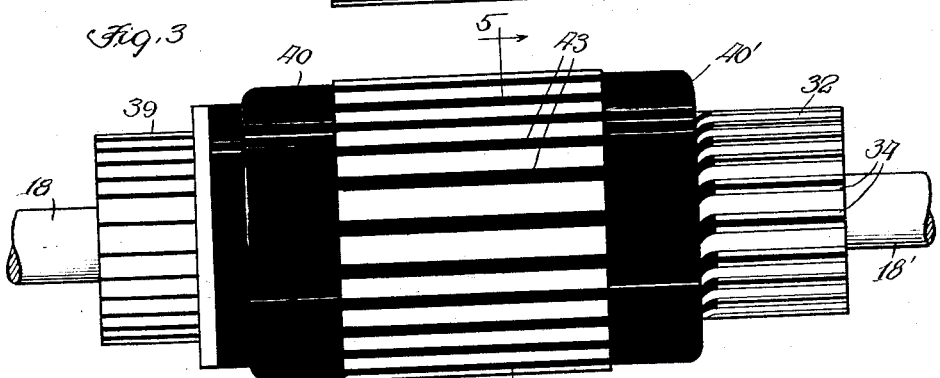
Figure 3 is an elevation of the completed armature with a commutator at each end.
Figure 4:
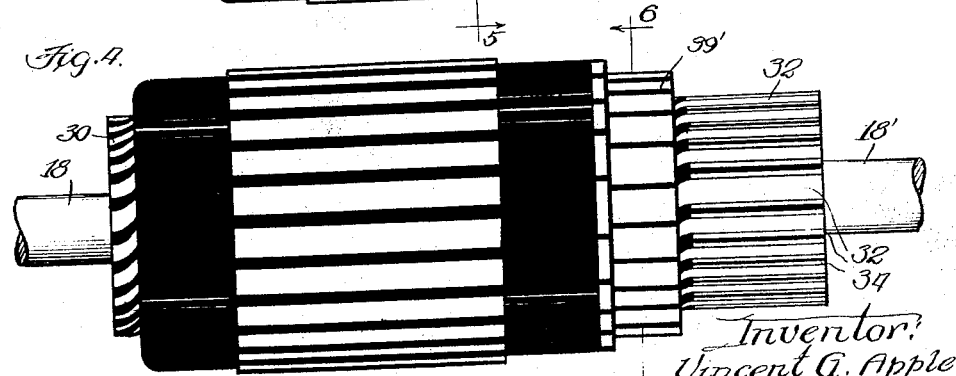
Figure 4 is a modified form with both commutators at one end.

When the armature is thus subjected to this method of insulation the gaps or spaces 42, terminating each slot 15, are thoroughly filled with the insulating compound, as more clearly shown in Figure 3 and Figure 4 of the drawings.

An armature, when constructed as described, may be used as a generator to produce current of two different and independent electro-motive-forces. It also may be used as a motor thru one circuit, and as a generator thru the other circuit of the armature, for the purpose of charging storage batteries or for the purpose of starting internal combustion engines and to subsequently charge storage batteries, and for many other desirable purposes for which a device of this character may be employed. Every part of material, of which the armature is composed, is actively energetic and therefore the armature produces a large output of current or power proportionally to its weight.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. In an armature, a conductor loop, composed of two conducting bars and integral commutator bars of substantially the same cross-sectional area throughout its entire length but of different cross-sectional shape.

2. In an armature, a conductor loop, composed of two tapering conducting bars and integral commutator bars of substantially the same cross-sectional area throughout its entire length, said bars when placed one upon the other forming uniformly tapered wedge-shape conducting bars and composite commutator bars.

3. In an armature, a conductor loop composed of two tapering conducting bars and integral commutator bars of substantially the same cross-sectional area throughout its entire length, said bars when placed one upon the other forming a uniformly tapered wedge-shaped, composite bar and a commutator composed of a plurality of sections, each section made up of a pair of integral terminal ends of two said tapered bars of the same sectional area.

4. In an armature, a conductor loop composed of two tapering conducting bars and integral commutator bars of substantially the same cross-sectional area, said bars when placed one upon the other forming a uniformly tapered wedge-shaped, composite bar of unchanged sectional area, a commutator composed of a plurality of sections, each section made up of the terminal ends of two said bars, and a moldable plastic material supporting and cementing the parts together.

5. In an armature, a conductor loop composed of two tapering conducting bars and integral commutator bars of substantially the same cross-sectional area, said bars when placed one upon the other forming a uniformly tapered wedge-shaped composite bar, a commutator, composed of a plurality of sections, each section made up of the terminal ends of a pair of said bars, a U-shaped metal cover partly surrounding the paired ends of the bars forming each commutator section, and a phenolic condensation product supporting and cementing the parts together.

6. In an armature, a core having a plurality of radially-disposed outwardly-diverging, tapering slots, with separating teeth of substantially uniform width therebetween, a pair of superimposed, correspondingly tapering conducting bars, of substantially the same cross-sectional area, in the inner portion of each slot, an independent winding in the outer portion of each slot, a commutator for the inner winding composed of integral parts of the bars of said winding and a commutator of larger diameter for the outer winding overlying a portion of the inner winding.

7. In an armature, a plurality of conducting loops, each loop comprising two uniformly and transversely tapering bars of different height and width but of substantially the same cross-sectional area, the terminals of the bars paired to provide from each pair a radially tapering integral commutator section.

8. An armature core comprising a plurality of electrically separated disks cemented together and two shaft sections each carrying a heavier disk cemented to the outer disks at the respective ends of the core and in axial alignment.

9. The method of making an armature which consists in laying upon a core two separate windings, commutators in communication with the respective windings, the commutator for the outer winding overlying part of the inner winding, and cementing the windings together, to the core and to the commutators by application of phenolic condensation product under pressure while subjected to heat.

10. A dynamo electric machine element comprising a core, insulation, and a plurality of inductor loops composed of wedge shaped bars split longitudinally and bent into loops and inserted in the core and joined to complete the circuit.

In testimony whereof I have hereunto subscribed my name.

VINCENT G. APPLE.